Patented Feb. 17, 1931

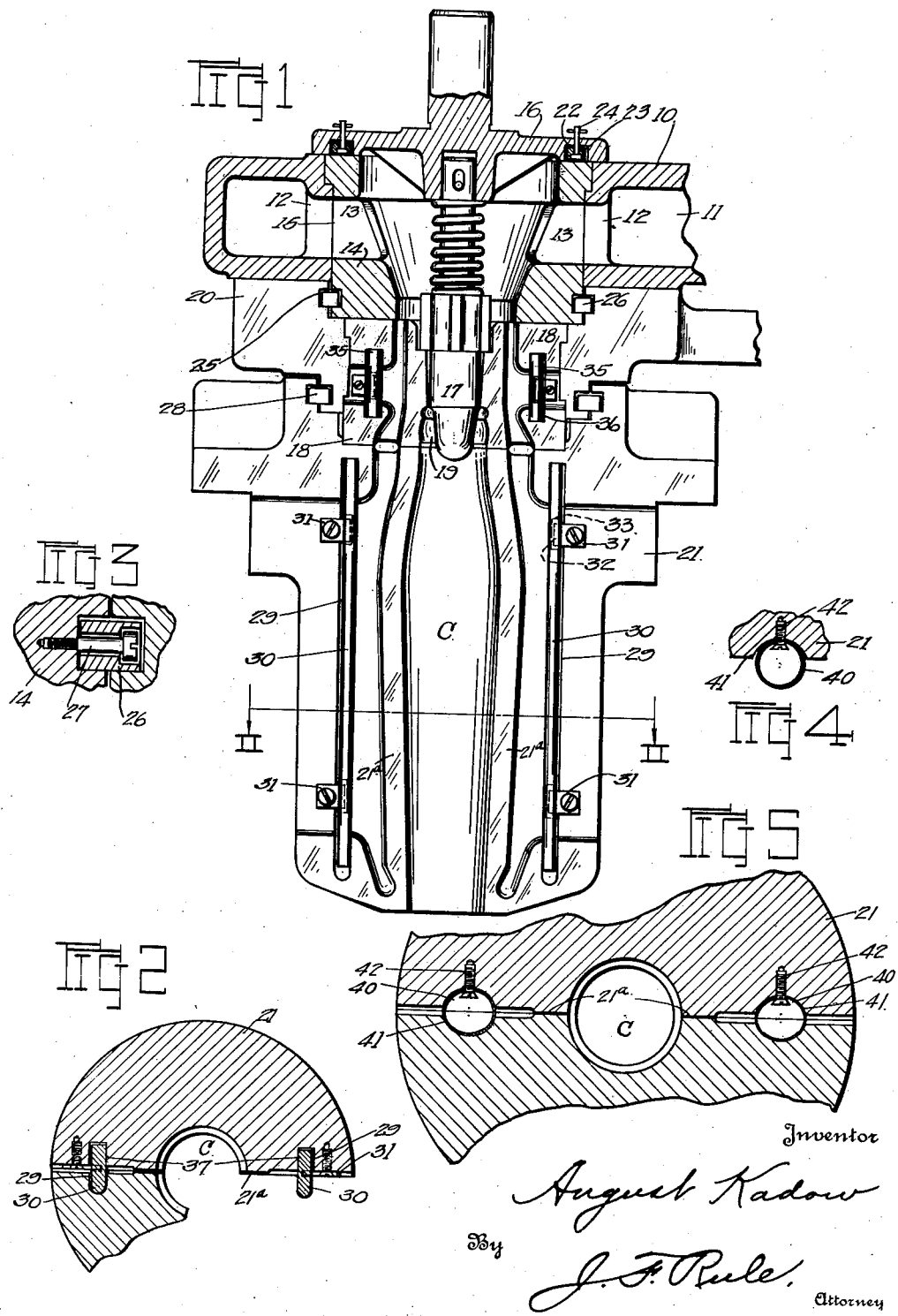

1,792,988

UNITED STATES PATENT OFFICE

AUGUST KADOW, OF TOLEDO, OHIO, ASSIGNOR TO OWENS-ILLINOIS GLASS COMPANY, OF TOLEDO, OHIO, A CORPORATION OF OHIO

APPARATUS FOR FORMING HOLLOW GLASSWARE

Application filed July 23, 1928. Serial No. 294,735.

The present invention relates to improvements in apparatus for forming hollow glassware, and more particularly to the construction of suction gathering or blank molds.

In the modern type of machine for forming hollow glassware and particularly the well known Owens type, the blank molds are brought one at a time into contact with the surface of a supply body of molten glass and while in such contact suction is applied to the mold cavity to charge the latter with molten glass. These molds comprise two co-operating sections which are brought together just prior to reaching the charging station. At a predetermined point following the charging operation, the mold sections are moved apart to permit a finishing mold to enclose the parison preparatory to expansion of the parison to its final shape.

Due to the intense heat to which the gathering or blank molds are subjected, the mold sections frequently warp. This warping creates leaks along the parting line of the mold and prevents creation of a sufficient degree of vacuum within the mold cavity to completely fill the cavity with molten glass in the period of time allotted to the gathering operation, so that the mold cavity is quite frequently only partly filled with glass.

Further, it has heretofore been necessary to quite accurately machine the meeting or opposed faces of the mold sections in order to avoid vacuum leakage along the parting line of the suction gathering mold. This operation quite obviously involves considerable expense and labor, which for the greater part, may be eliminated by use of the present invention.

It has been found that vacuum leakage is not entirely confined to the blank or gathering molds, but instead is also present in the neck molds and gathering heads. This is due to inaccurate machining or fitting of certain of the meeting faces of the several parts and to the wear of the latter after certain periods of use.

An important object of the present invention is to provide novel and effective means to overcome the above objections, said means comprising a construction which operates automatically and insures against vacuum leakage along the parting lines of the molds and elements associated therewith.

Another object is to provide what I term "floating sealing pins" which automatically assume sealing positions relative to the mold cavity, when suction is applied to the cavity. Thus, leakage is prevented and complete filling of the mold cavity by suction at the charging station is assured. It therefore follows that the parisons will be of uniform weight and shape, these factors being of considerable importance in the production of high grade ware. It is also an object to provide sealing pins for the partible neck mold ordinarily associated with the charge gathering mold units whereby to further insure against leakage of vacuum during the mold charging operation.

Other objects of my invention will be apparent hereinafter.

Referring to the accompanying drawings:—

Fig. 1 is a sectional elevation thru a charge gathering and parison forming unit embodying the present invention.

Fig. 2 is a sectional view taken substantially at the line II—II on Fig. 1 and including a fragment of the other mold section.

Fig. 3 is a detail sectional view illustrating the means for securing the vacuum sealing rings to the neck mold carrier and gathering head.

Fig. 4 is a detail sectional view of another form of sealing pin.

Fig. 5 is a fragmentary horizontal sectional view thru a gathering mold, showing the manner in which this second form of sealing pin functions.

In the drawings, Figs. 1, 2 and 3 illustrating the preferred form of the invention, sealing pins and rings are provided in the parison forming unit wherever there is a possibility of vacuum leakage without such pins or rings.

The parison forming and charge gathering unit illustrated comprises an arm 10 formed with a passageway 11 opening thru ports 12 into an annular chamber 13 formed in a gathering head 14. This arm 10 is provided with a vertical opening 15 in which said gathering head 14 is removably arranged. A cap plate 16 is provided to close the upper side of the gathering head 14 and carries a plunger 17 whose tip projects downwardly thru said head 14 and co-operates with partible neck mold thimble 18 in forming a neck or finish cavity 19.

The neck mold thimble 18 is removably supported in a neck mold carrier 20 which preferably is formed in two sections in accordance with the usual practice.

The suction gathering or blank mold 21 comprises a pair of co-operating mold sections which close about the lower end of the neck mold carrier 20 and thimble 18 in the formation of a cavity "C" in which parisons are formed. A construction of the character just outlined quite frequently embodies such formation that satisfactory application of vacuum to the mold cavity is not readily obtainable, with the result that partially, or imperfectly, formed parisons result from the use of such molds.

According to the present invention the lower face of the cap 16 is formed with a downwardly opening annular channel 22 or groove adjacent its periphery to receive a sectional sealing ring 23. This ring is preferably rectangular in cross section and loosely secured in the annular channel by holding pins 24 or similar fasteners which extend upwardly thru openings in said cap 16. These pins 24 are slidable vertically in said openings in the cap 16 so that the sealing ring is free for vertical movement and may be drawn into sealing contact with the upper surface of the gathering head 14 when vacuum is applied to the mold cavities. Other fastening means might well be employed in place of the pins 24, the prime object being to mount the ring for movement under influence of vacuum.

The neck mold carrier 20 (Fig. 1) and lower portion of the gathering head 14 have their vertical meeting faces provided with annular channels 25 which register with each other and enclose a sealing ring 26 when the mold unit is being used. In the event this ring 26 is made up of several sections, each section will be connected either to the corresponding neck mold carrier section or to the lower portion of the gathering head 14 substantially as shown in Fig. 3. The fastening means (Fig. 3) includes a bolt 27 extending thru the sealing ring 26 and threaded into the downward extension of the gathering head 14. The opening in the sealing ring is of greater length and diameter than the bolt 27 so that said ring is capable of multi-directional movement in the channels 25 when vacuum is applied to the mold cavity. Thus, this ring may be drawn into snug contact with the lower walls of the opposed recesses 25 and spans the space between the neck mold carrier 20 and gathering head 14 so vacuum leakage at this point will be avoided.

A two-part sealing ring 28 is arranged between the meeting vertical faces of the neck mold carrier 20 and the upper portions of the parison mold 21. This sealing ring 28 may be mounted in the same fashion as the sealing ring 26 just described, and functions to prevent vacuum leakage between the neck mold carrier 20 and the parison or gathering mold.

In providing the parison or gathering mold 21 with means to seal the mold cavity and prevent entry of outside air into the cavity while the mold is being charged with glass, the mold sections are formed with pairs of opposed vertical or longitudinal channels 29 in their meeting faces as shown in Fig. 2, to receive sealing pins or strips 30. The channels 29 in one of the mold sections carry the sealing pins 30, which pins are shown in Figs. 1 and 2 to comprise elongated strips substantially rectangular in cross-section and loosely seated in said channels and retained therein by fasteners 31. These fasteners may comprise flat metal strips secured to the flat inner face of one mold section and having fingers 32 projected into over-sized openings 33 in the bars. This construction permits the sealing pins or bars to move longitudinally as well as radially relative to the axes of the mold cavities.

The entire areas of the opposed flat faces of the mold sections need not be machined for contact with each other but may (see Figs. 1 and 2) merely have those portions 21ᵃ in proximity to and forming part of the cavity walls, more or less accurately finished. The remaining areas may be cut away so that when the mold sections are brought together said areas do not contact with each other. Any leakage which would be caused by irregularities in these surfaces is prevented by the presence of the sealing pins.

Preferably the neck mold thimble sections are provided with sealing bars or strips constructed and affixed to the mold sections in the same manner as that set forth in connection with the blank mold. These bars or strips 35 are loosely held in vertical or longitudinal recesses 36 and are adapted to have portions projecting into recesses formed in the co-operating mold section. The opposed flat faces of these sections are cut away in a fashion corresponding to that in which the parison mold sections are machined.

From the above it is evident that when the gathering mold is dipped into a supply body of molten glass to gather a mold charge therefrom, and vacuum is applied to the mold cavity, the sealing pins or bars 30 are drawn inwardly toward the mold cavity into snug sealing engagement with the inner walls 37 of the channels 29. Thus vacuum leakage at the parting line of the mold is prevented and complete filling of the mold cavity with molten glass is assured. The sealing pins 35 in the neck mold thimble 18 also operate to prevent vacuum leakage between the meeting faces of the thimble sections. The application of vacuum also seats the sealing rings as shown in Fig. 1 to prevent leakage at the joints between the neck and blank molds and the gathering head 14 as well as between the supporting arm and cap plate 16.

In another form of the invention (Figs. 4 and 5) the sealing members comprise resilient tubes 40 intended to take the place of the solid rectangular bars 30. The opposed recesses 41 in the section of the blank mold 21 may be semi-circular in cross-section so that when the mold sections are brought together these semi-circular recesses co-operate to form a vertical or longitudinal opening which is more or less elliptical in cross-section. The sealing tubes 41 are secured by screws 42 or the like fasteners in the recesses in one of the mold sections. These tubes (Fig. 5) which are normally circular in cross-section will be slightly distorted when the mold sections are brought together, such distortion being due to the compression of the tubes as shown in Figs. 4 and 5. Such distortion of the tubes effects air tight sealing engagement between the tubes and walls of said recesses.

In this form of the invention vacuum is not entirely depended upon to effect sealing engagement between said sealing tubes 41 and the mold sections. Instead, the tubes are formed of comparatively light sheet metal and are pressed firmly into sealing engagement with the mold sections when the latter are brought together to close the mold preparatory to dipping into the molten glass.

Modifications may be resorted to within the spirit and scope of the appended claims.

What I claim is:

1. In combination, an article forming mold comprising mold sections movable into and out of co-operative relation to each other, and sealing members arranged between the meeting faces of said sections, said members mounted for movement relative to the mold sections.

2. The combination with a suction gathering mold including partible sections, of sealing pins arranged between the meeting faces of said mold, said pins mounted for movement relative to the mold sections.

3. The combination of a partible suction gathering mold, a partible neck mold co-operating with the gathering mold, sealing pins arranged between the meeting faces of the gathering mold sections, and sealing pins arranged between the meeting faces of the neck mold sections.

4. In combination, a neck mold carrier, a partible neck mold thereon, a partible suction gathering mold adapted to cooperate with the neck mold, and sealing pins individual to the neck and gathering molds and arranged between the meeting faces of the mold sections.

5. In combination, a neck mold carrier, a partible neck mold thereon, a partible suction gathering mold adapted to cooperate with the neck mold, sealing pins individual to the neck and gathering molds and arranged between the meeting faces of the mold sections, and a sectional sealing ring interposed between the adjacent faces of the neck mold carrier and suction gathering mold sections.

6. In combination, a neck mold carrier, a partible neck mold thereon, a partible suction gathering mold adapted to cooperate with the neck mold, sealing pins individual to the neck and gathering molds and arranged between the meeting faces of the mold sections, and a sectional sealing ring interposed between the adjacent faces of the neck mold carrier and suction gathering mold sections, said pins and ring adapted to be operatively positioned by application of vacuum to the mold cavities.

7. The combination of a mold comprising partible sections, and yielding means interposed between the sections to effect a seal along the parting line of said sections.

8. The combination of a mold comprising partible section, and yielding sealing pins extending longitudinally of the mold and interposed between the sections to effect a seal along the parting line of said sections.

9. In combination, a suction gathering mold comprising partible sections, said sections formed with recesses adapted to be brought into register with each other to form a mold cavity, a pair of opposed recesses extending lengthwise of the meeting faces of the sections at each side of the mold cavity, and a sealing pin arranged in one of each pair of said opposed recesses and adapted to be projected into the other recess when the mold sections are brought together, said pins mounted for movement in the recesses to insure sealing contact between the pins and walls of the opposed recesses.

10. The combination of a mold comprising partible sections, and compressible tubes interposed between the sections to effect a seal along the parting line of said sections.

11. In combination, a neck mold carrier, a partible neck mold thereon, a partible suction gathering mold adapted to co-operate with the neck mold, and a sectional sealing ring interposed between the adjacent faces of the neck mold carrier and the suction gathering mold.

Signed at Toledo, Ohio, this 20th day of July, 1928.

AUGUST KADOW.